United States Patent [19]

Tsuda

[11] Patent Number: 4,962,801
[45] Date of Patent: Oct. 16, 1990

[54] PNEUMATIC TIRES HAVING UNIDIRECTIONAL TREAD PATTERN

[75] Inventor: Toru Tsuda, Higashimurayama, Japan

[73] Assignee: Bridgestone Corporation, Tokyo, Japan

[21] Appl. No.: 308,083

[22] Filed: Feb. 9, 1989

[30] Foreign Application Priority Data

Feb. 9, 1988 [JP] Japan .................................. 63-26588

[51] Int. Cl.$^5$ ............................................. B60C 11/11
[52] U.S. Cl. ................................................ 152/209 R
[58] Field of Search ........... 152/209 R, 209 A, 209 D

[56] References Cited

U.S. PATENT DOCUMENTS 3,705,613 12/1972 Verdier ............................. 152/209 R

FOREIGN PATENT DOCUMENTS 62-214004 9/1987 Japan .
159109 7/1988 Japan ............................... 152/209 D Primary Examiner—Michael W. Ball
Assistant Examiner—Geoffrey L. Knable

[57] ABSTRACT

A pneumatic tire having a unidirectional tread pattern comprises a plurality of main slant grooves obliquely extending from an end of said tread toward a central portion of said tread and arranged at a given space in the circumferential direction of the tire, and at least two auxiliary slant grooves arranged in an island portion defined between two adjoining main slant grooves in the circumferential direction.

7 Claims, 5 Drawing Sheets

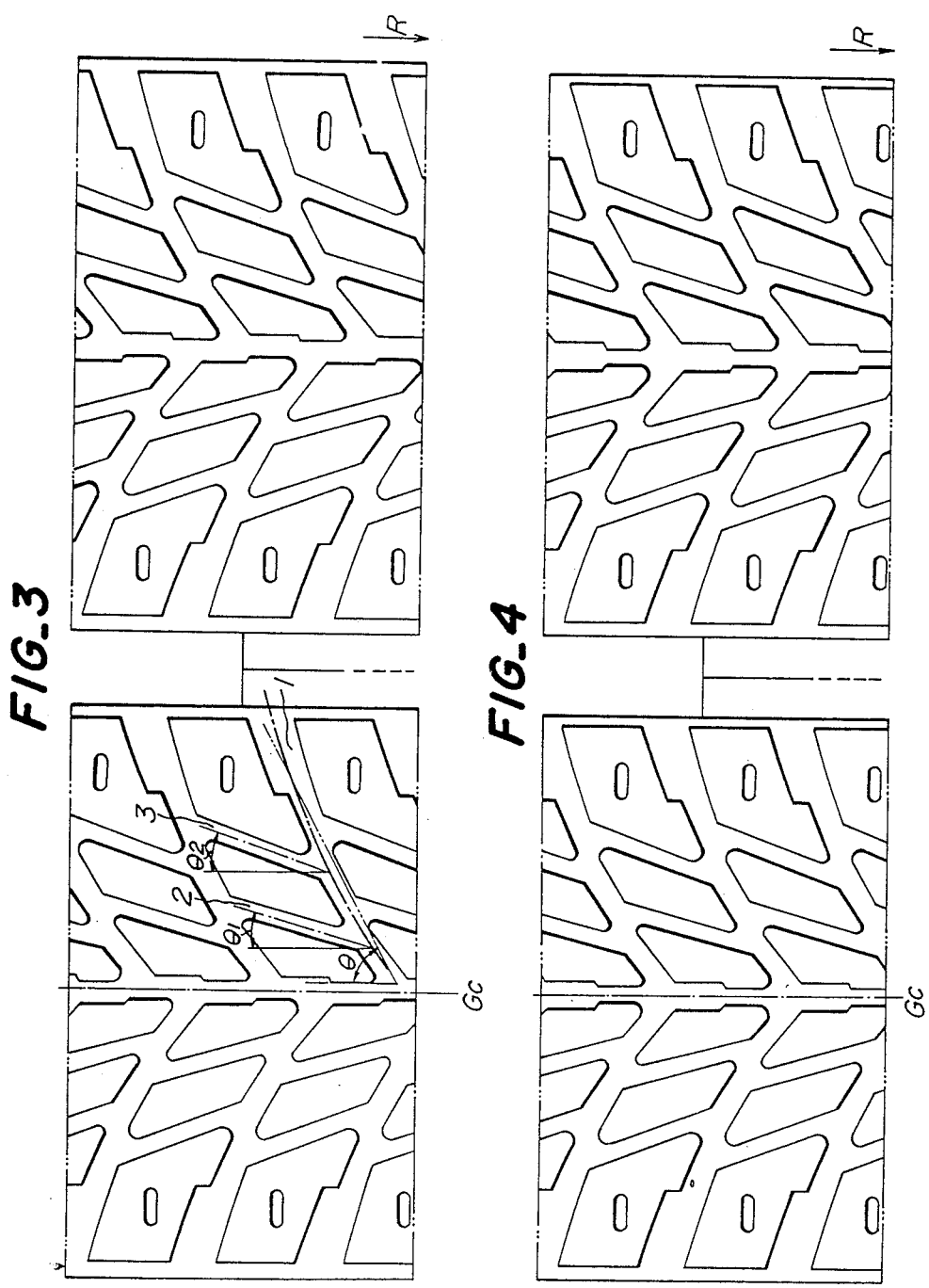

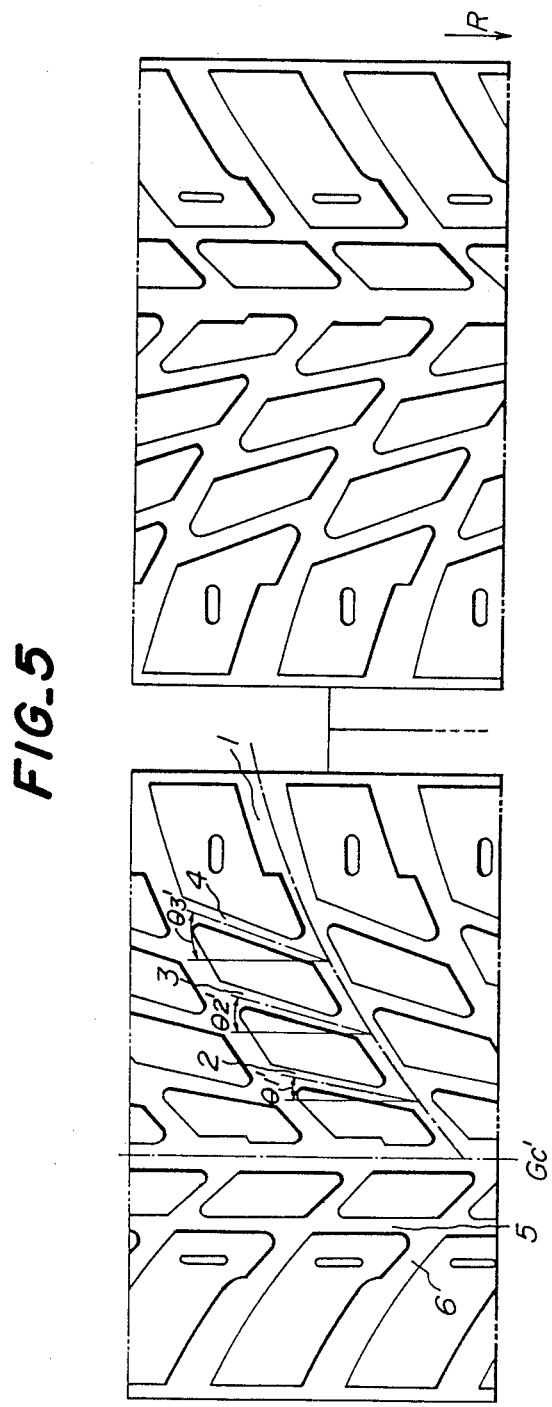

PNEUMATIC TIRES HAVING UNIDIRECTIONAL TREAD PATTERN

BACKGROUND OF THE INVENTION

1. Field of the Invention

This invention relates to pneumatic tires having a unidirectional tread pattern, and more particularly to a pneumatic tire having improved cornering stability and noise reduction on off road or snow road conditions by improving the tread pattern of the tire.

2. Related Art Statement

Since the pattern of grooves formed in the tire tread has a large influence upon steering, braking, noise generation and the like of automotive vehicles, many kinds of patterns are designed from old concepts. Especially, tires having a pattern with a combination of grooves extending in the circumferential direction of the tire and slant grooves obliquely extending from the tread end toward the equator of the tire are used as a tire for off road or snow road conditions because of a high gripping force against road surface.

FIG. 6 is a plan view of a tread pattern of the conventional tire provided with slant grooves, wherein T is a tread, Gc is an equator of the tire, Ta and Tb are both tread ends, TW is a tread width and R is a rotational direction of the tire. In the tread pattern of FIG. 6, slant grooves 1a and 1b obliquely extend from both tread ends toward the equator of the tire. On the other hand, circumferential grooves 2a, 3a or 2b, 3b extending in parallel to the equatorial plane of the tire and continuously in the circumferential direction thereof cross over the slant groove 1a or 1a to form X-shaped crossroads.

As shown in FIG. 6, when the X-shaped crossroad is formed by crossing the circumferential groove over the slant groove, the road gripping force in the edge portion of each block on the tire tread, i.e. the edge effect thereof lowers on the off road or snow road due to the presence of X-shaped crossroads as the groove. The tire having this tread pattern is liable to interfere with the running because it is difficult to increase a component perpendicular to the equator of the tire, i.e. an axial component from a viewpoint of the pattern structure. In other words, tires having such a pattern are effective for the reduction of noise, but have a problem on the running performances.

As mentioned above, the tread pattern of the tire for the automotive vehicles is recently demanded to simultaneously possess the excellent running performances and the prevention of noise generation.

SUMMARY OF THE INVENTION

It is, therefore, an object of the invention to solve the aforementioned problems of tires having patterns of the conventional arrangement.

According to the invention, there is the provision of a pneumatic tire comprising a tread toroidally connected at its both ends to a pair of sidewalls, and a plurality of main slant grooves obliquely extending from an end of said tread toward a central portion of said tread and arranged at a given space in the circumferential direction of the tire, characterized in that an island portion defined between two adjoining main slant grooves in the circumferential direction is obliquely extended between said adjoining main slant grooves with respect to the equator of the tire and at least two auxiliary slant grooves including a first auxiliary slant groove located nearest to the equator and an n-th auxiliary slant groove nearest to said end of the tread are formed in said island portion so as to satisfy the following relationship:

$$\theta a > \theta an > \theta a(n-1) > \ldots \theta a2 > \theta a1$$

when the inclination angle of said main slant groove is $\theta a$, the inclination angle of said first auxiliary slant groove is $\theta a1$ and the inclination angle said n-th auxiliary slant groove is $\theta an$.

In use, the tire according to the invention is mounted onto an automotive vehicle so that when optionally taking a main slant groove in the rotational direction of the tire, the island portion adjacent to the main slant groove gradually comes into contact with ground from the equator side of the tire toward the side end of the tread.

BRIEF DESCRIPTION OF THE DRAWINGS

The invention will be described with reference to the accompanying drawings, wherein:

FIGS. 3 to 5 are plan views of another embodiments of the tread patter according to the invention, respectively.

DESCRIPTION OF THE PREFERRED EMBODIMENTS

Figure 1:
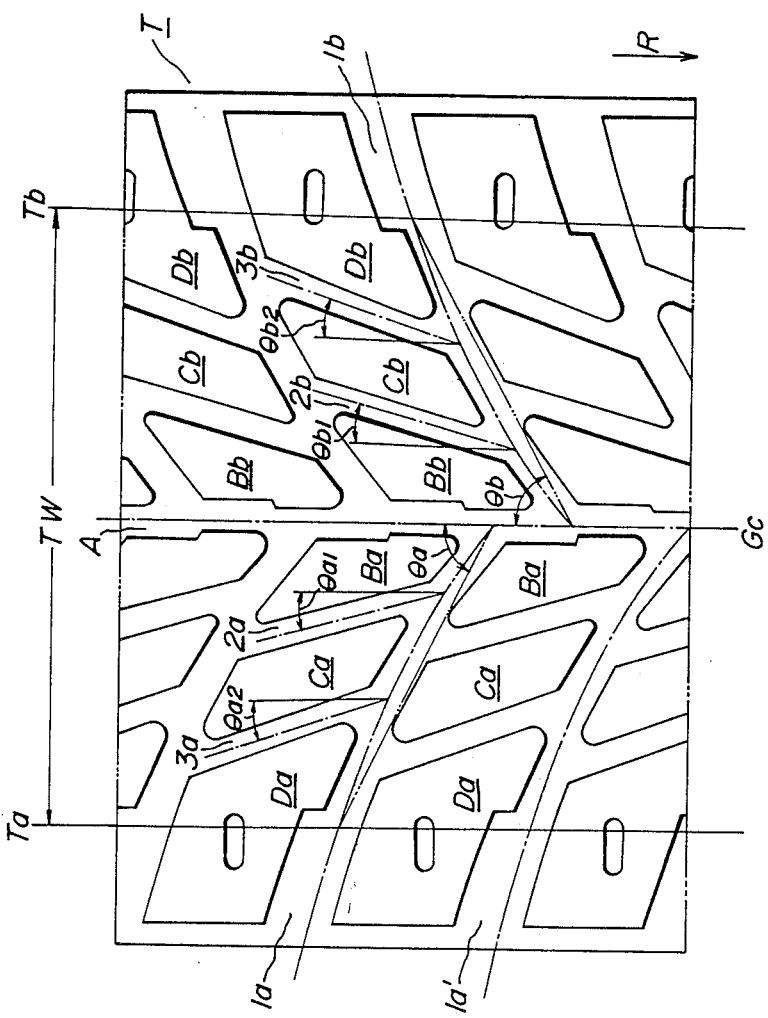
FIG. 1 is a plan view of a first embodiment of the tread pattern in the pneumatic tire according to the invention.

FIG. 1 shows a plan view of a first embodiment of the tire according to the invention, wherein T, Ta, Tb, Gc, TW and R are the same as previously mentioned.

In the illustrated tire, the tread pattern is symmetrical with respect to the equator of the tire around a center groove A continuously extending on the equator in the circumferential direction of the tire, wherein a left-side region with respect to the equatorial plane is called as an a-region and a rightside region is called as a b-region. In this case, the a-region and b-region are symmetrical with each other, so that the tire will be described with respect to only the a-region.

In the tread pattern of FIG. 1, a plurality of main slant grooves 1 (e.g. 1a in the a-region) extending from an end Ta of the tread T to the center groove A are arranged in each of the a-region and b-region at a given space in the circumferential direction to divide each of the a-region and b-region into plural island portions. At least two auxiliary slant grooves 2, 3 (two auxiliary slant grooves 2a, 3a in the embodiment of FIG. 1) each extending from the main slant groove 1a to the adjoining main slant groove (1'a in FIG. 1) are arranged in each of these island portions to divide the island portion into blocks B, C and D. Among the two auxiliary slant grooves of FIG. 1, the auxiliary slant groove 2a is called a first auxiliary slant groove because it is located nearest to the equator Gc of the tire and the auxiliary slant groove 3a is called a second auxiliary slant groove because it is located nearest to the tread end Ta.

According to the invention, the term "inclination angle $\theta$ of the main slant groove" used herein means an inclination angle of a line segment obtained by connecting an intersect between a center line of the main slant groove and the equator of the tire to an intersect between the center line and the tread end with respect to the equator Gc of the tire at an acute angle side. Further, the term "inclination angle $\theta$ of the auxiliary slant groove" used herein means an inclination angle of a line segment obtained by connecting intersects of a center line of the auxiliary slant groove with the center lines of the adjoining two main slant grooves to each other with respect to the equator Gc of the tire at an acute angle side.

In the tread pattern of FIG. 1, therefore, when the inclination angle of the main slant groove 1a is $\theta$a, the inclination angle of the first auxiliary slant groove 2a is $\theta$a1 and the inclination angle of the second auxiliary slant groove 3a is $\theta$a2, these inclination angles satisfy the following relationship:

$$\theta a > \theta a2 > \theta a1$$

Although the number of auxiliary slant grooves in FIG. 1 is 2, if the number of auxiliary slant grooves is n, the inclination angles of the main and auxiliary slant grooves are required to satisfy the following relationship:

$$\theta a > \theta an > \theta a(n-1) > \ldots > \theta a2 > \theta a1$$

According to the invention, the auxiliary slant groove extends from one of the main slant grooves to the adjoining main slant groove, but never extends through this adjoining main slant groove to the next adjoining main slant groove. That is, the main slant groove crosses with the auxiliary slant groove in a T-shaped form but never crosses therewith in an X-shaped form.

The tire shown in FIG. 1 is mounted onto an automotive vehicle so as to rotate in a direction shown by an arrow R. Thus, when the vehicle is run forward, viewing, for example, the main slant groove 1a, the island portion adjacent to the main slant groove 1a gradually comes into contact with the ground from the equator side of the tire toward the tread end.

In order to prevent the occurrence of tire noise, it is necessary that the edge of the block is not matched with the stepping-in form of the tire as far as possible. In this connection, FIG. 2 diagrammatically shows a stepping-in form of the tire having the tread pattern shown in FIG. 1.

Figure 2:
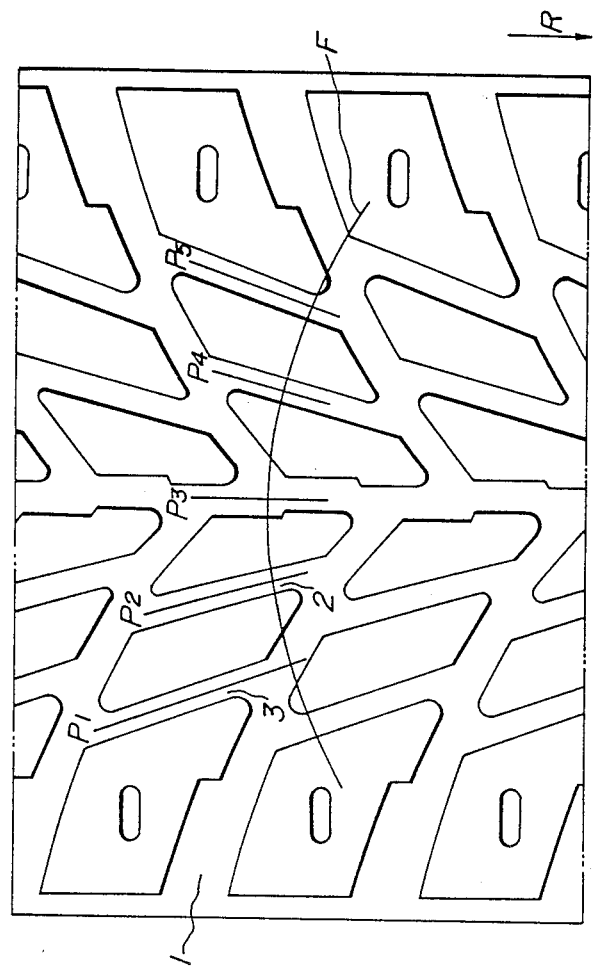
FIG. 2 is a diagrammatical view showing stepping-in state of FIG. 1.

In FIG. 2, a curve F shows the stepping-in form, and P1 to P5 are normal lines to the curve F, respectively. When comparing FIGS. 1 and 2, it is understood that each normal line P1 to P2 is well coincident with each of the auxiliary slant grooves. This means that when the tire is run on, for example, wet road, the occurrence of noise is prevented while draining water through the auxiliary slant grooves because the block edge is not matched with the stepping-in form of the tire. Moreover, it is preferable that the difference of the auxiliary slant groove from the normal line is not more than 35°.

On the other hand, the auxiliary slant groove is discontinuous in the circumferential direction of the tire because it is dammed by the edge of the block at the main slant groove. By this technique the edge effect on off road or snow road is derived.

Considering the problem of embedding the groove with mud in use on off road, the inclination angle of the main slant groove (e.g. $\theta$a of the groove 1a) with respect to the equator Gc is preferable within a range of 30°~75°, more particularly 45°~65°. That is, the mud and snow discharging properties are improved by maintaining the inclination angle of the main slant groove within the above range. When the inclination angle of the main slant groove exceeds 75°, it approaches the stepping-in form and the prevention of the occurrence of noise becomes disadvantageous. When the inclination angle of the main slant groove is less than 30°, it approaches the inclination angle of the auxiliary slant groove (e.g. the groove 2a), so that the block defined by these slant grooves (e.g. block Ba) becomes considerably longer in the longitudinal direction and it is difficult to hold the desired rigidity.

In FIG. 3 in plane view illustrates a state of mounting the tire shown in FIG. 1 onto an automotive vehicle. This tire has a tire size of 31×10.50 R15 and a tread width of 210 mm, wherein the main and auxiliary slant grooves 1, 2 and 3 having different inclination angles in the same direction with respect to the equator of the tire are symmetrically arranged in both a- and b-regions of the tread with respect to the equatorial plane of the tire. The main slant groove has a width of 12 mm and an inclination angle $\theta$ of 65°, and the auxiliary slant grooves 2 and 3 have a width of 10 mm and inclination angles $\theta$1 and $\theta$2 of 15° and 20°, respectively. Although the tread pattern of this tire is substantially in axial symmetry with respect to the equator Gc of the tire, the patterns of the left-half region and right-half region are shifted at a half pitch in the circumferential direction of the tire, which acts to promote the reduction of sound pressure in the pattern noise.

FIG. 4 is a modified embodiment of FIG. 3, wherein the patterns of the left and right regions are not shifted in the circumferential direction.

FIG. 5 shows a state of mounting another tire according to the invention onto an automotive vehicle. In this tire, the pattern facing inward the vehicle and inside a line G'c in parallel to the equator Gc of the tire is based on the pattern defined in the invention, wherein three auxiliary slant grooves 2, 3 and 4 having the same width as in FIG. 3 are arranged in each island portion defined between the adjoining main slant grooves 1. In this case, the inclination angles of these auxiliary slant grooves 2, 3 and 4 with respect to the line Gc' have $\theta'1 = 10°$, $\theta'2 = 14°$ and $\theta'3 = 18°$, respectively.

On the other hand, the inclination angle of the main slant groove 1 with respect to the line Gc' is 55° near to the line Gc' and 65° at the tread end and continuously changes therebetween. That is, according to the invention, the main slant groove 1 may be arranged to have a certain curvature. Further, a groove 5 located in parallel to the line Gc' and having a width of 8 mm is arranged in an island portion of the region facing outside the line Gc' and crosses with a slant lug groove 6 having a width of 10 mm at a side of the line G'c and 16 mm toward the tread end.

The invention will be described with reference to the following example.

EXAMPLE

Figure 6:
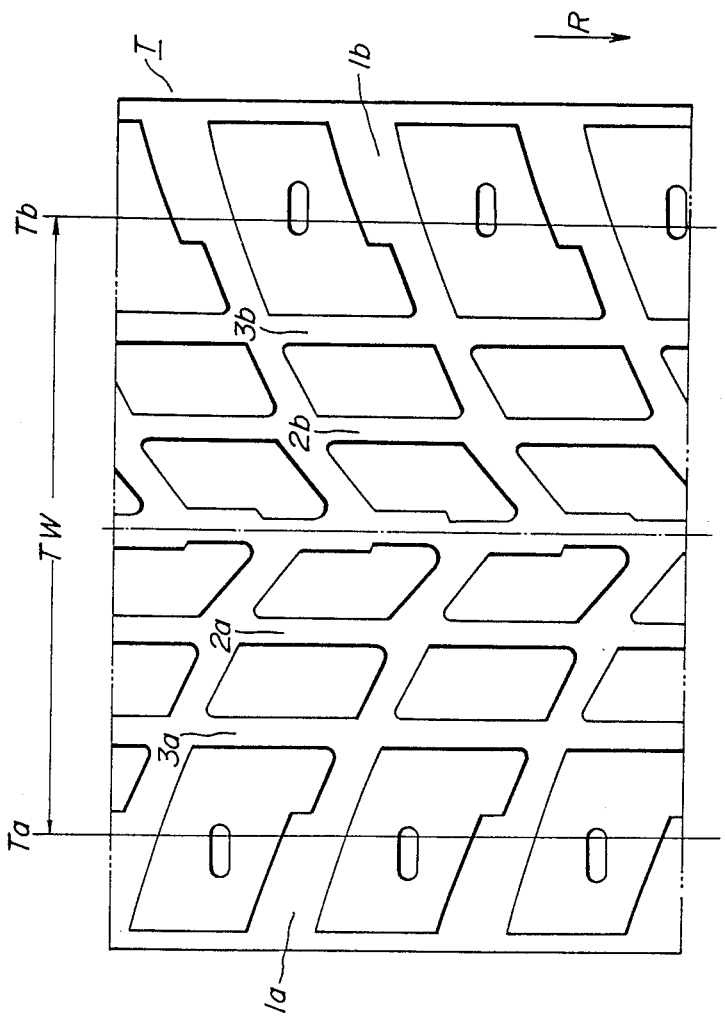
FIG. 6 is a plan view of the tread pattern in the conventional tire.

There were provided three test tires, in which a first tire was the tire having the tread pattern of FIG. 1, a second tire was the tire having the tread pattern of FIG. 5, and a third tire was the conventional tire having the tread patter of FIG. 6 as a standard tire. After each of these tires was mounted onto a four-wheel driving vehicle, the running performances on off road were evaluated by a feeling test through a professional driver. The evaluation results are shown in the following Table 1 by an index on the basis that the standard tire is 100.

TABLE 1

| off road performances | | Standard tire | Tire of FIG. 1 | Tire of FIG. 5 |
|---|---|---|---|---|
| muddy road surface | traction | 100 | 103 | 102 |
| | cornering | 100 | 106 | 108 |
| snow road surface | traction | 100 | 105 | 104 |
| | cornering | 100 | 108 | 110 |
| pattern noise | | 100 | 102 | 104 |
| (the larger the index value, the better the property) | | | | |

The tires according to the invention have the tread pattern as mentioned above, so that they develop the following effects:

(1) Since the blocks constituting the island portion of the tread are formed by the combination of the main slant groove and the auxiliary slant grooves having different inclination angles with respect to the equator of the tire, the edges of the blocks are not matched with the stepping-in form of the tire and the occurrence of noise is prevented;

(2) Since the auxiliary slant groove approaches to the normal line drawn to a curve of the stepping-in form, the drainage effect is improved; and (3) Since the auxiliary slant groove is not parallel to the circumferential direction of the tire but is oblique to the circumferential direction, the auxiliary slant groove is dammed by the main slant groove in T-shaped form and consequently the edge effect is more enhanced.

What is claimed is:

1. A pneumatic tire comprising; a tread toroidally connected at both ends to a pair of sidewalls, a unidirectional tread pattern having a plurality of main slant grooves obliquely extending from an end of said tread toward a central portion of said tread and arranged at a given space in the circumferential direction of the tire, an island portion defined between two adjoining main slant grooves in the circumferential direction obliquely extending between said adjoining main slant grooves with respect to the equator of the tire and, at least two auxiliary slant grooves including a first auxiliary slant groove located nearest to the equator and an n-th auxiliary slant groove nearest to said end of the tread formed in said island portion so as to satisfy the following relationship:

$$\theta a > \theta an > \theta a(n-1) > \ldots \theta a2 > \theta a1$$

where $\theta a$ is an inclination angle of said main slant groove defined by a line segment determined by connecting an intersect between a center line of said main slant groove and the equator of said tire to an intersect between the center line and a tread end with respect to the tire equator at an acute angle, $\theta a1$ is an inclination angle of said first auxiliary slant groove and, $\theta an$ is an inclination angle of said n-th auxiliary slant groove, where the inclination angles $\theta a1$ and $\theta an$ are defined by a line segment obtained by connecting intersects of a centerline of an auxiliary slant groove with the center lines of the adjoining two main slant grooves to each other with respect to the equator of the tire at an acute angle, and wherein an inclination direction of an auxiliary slant groove with respect to the equator of the tire is the same as an inclination direction of a main slant groove crossing said auxiliary slant groove, and auxiliary slant grooves extend only from one main slant groove to an adjoining main slant groove.

2. The pneumatic tire according to claim 1, wherein said inclination angle of said main slant groove is within a range of 30° to 75°.

3. The pneumatic tire according to claim 1, wherein a difference of said auxiliary slant groove from a normal line drawn to a curve of a stepping-in form of the tire is not more than 35°.

4. The pneumatic tire according to claim 1, wherein said inclination angle of said main slant groove is in a range of 45° to 65°.

5. The pneumatic tire according to claim 1 further comprising a circumferential groove dividing said tread.

6. The pneumatic tire according to claim 5, wherein said circumferential groove is positioned offset from said equator of said tire.

7. The pneumatic tire according to claim 5 further comprising an auxiliary circumferential groove separated from said circumferential groove by an island portion.

* * * * *